C. F. JOHNSON.

CIRCULATING SYSTEM FOR INTERNAL COMBUSTION ENGINES.

APPLICATION FILED JAN. 24, 1916.

Reissued July 4, 1916.

14,160.

2 SHEETS—SHEET 1.

Inventor:
Chester F. Johnson,
by Le Roi T. Williams.
Attorney

C. F. JOHNSON.

CIRCULATING SYSTEM FOR INTERNAL COMBUSTION ENGINES.

APPLICATION FILED JAN. 24, 1916.

Reissued July 4, 1916. 14,160.

2 SHEETS—SHEET 2.

Inventor:
Chester F. Johnson.
by H. Roi J. Williams
Attorney.

UNITED STATES PATENT OFFICE.

CHESTER F. JOHNSON, OF DETROIT, MICHIGAN.

CIRCULATING SYSTEM FOR INTERNAL-COMBUSTION ENGINES.

14,160. Specification of Reissued Letters Patent. Reissued July 4, 1916.

Original No. 1,145,995, dated July 13, 1915, Serial No. 847,587. Application for reissue filed January 24, 1916. Serial No. 74,041.

*To all whom it may concern:*

Be it known that I, CHESTER F. JOHNSON, a citizen of the United States, and a resident of Detroit, in the county of Wayne and State of Michigan, have invented a new and Improved Circulating System for Internal-Combustion Engines, of which the following is a specification.

This invention relates to a cooling-liquid circulating-system for internal combustion engines, and its objects are: to provide means whereby the temperature of the cylinder cooling-liquid may be maintained substantially constant regardless of variations in the weather; and to provide means whereby a portion of the cylinder cooling-liquid may be directed into contact with the wall of the carbureting chamber or mixture passages to maintain a temperature therein high enough to insure proper carburation.

This invention consists in the details of construction shown and described and particularly pointed out in the claims.

Figure 1:
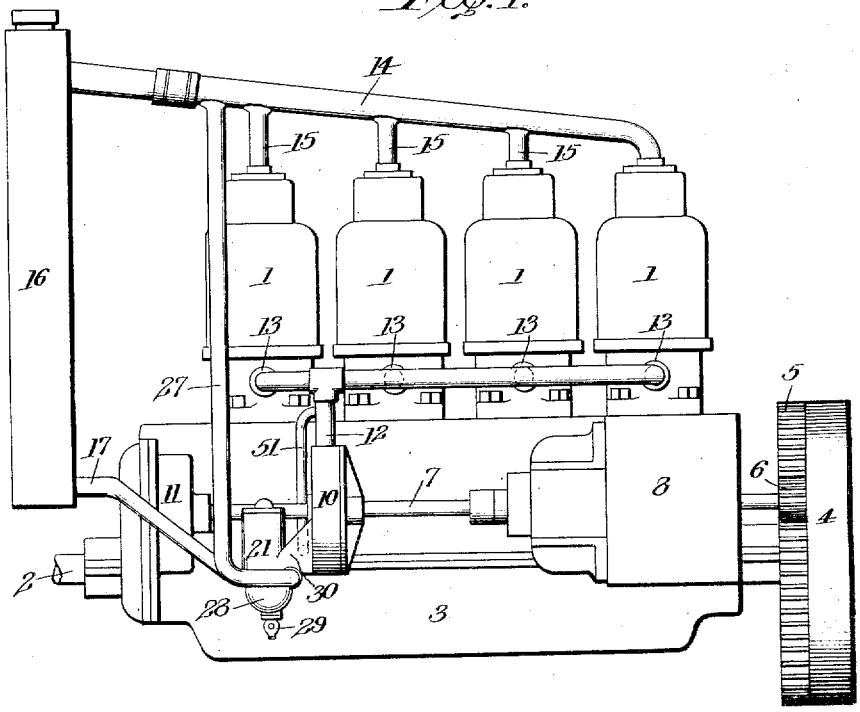
Figure 2:
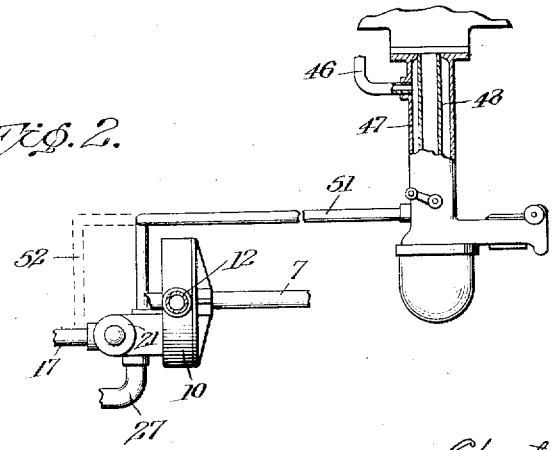
Figure 3:
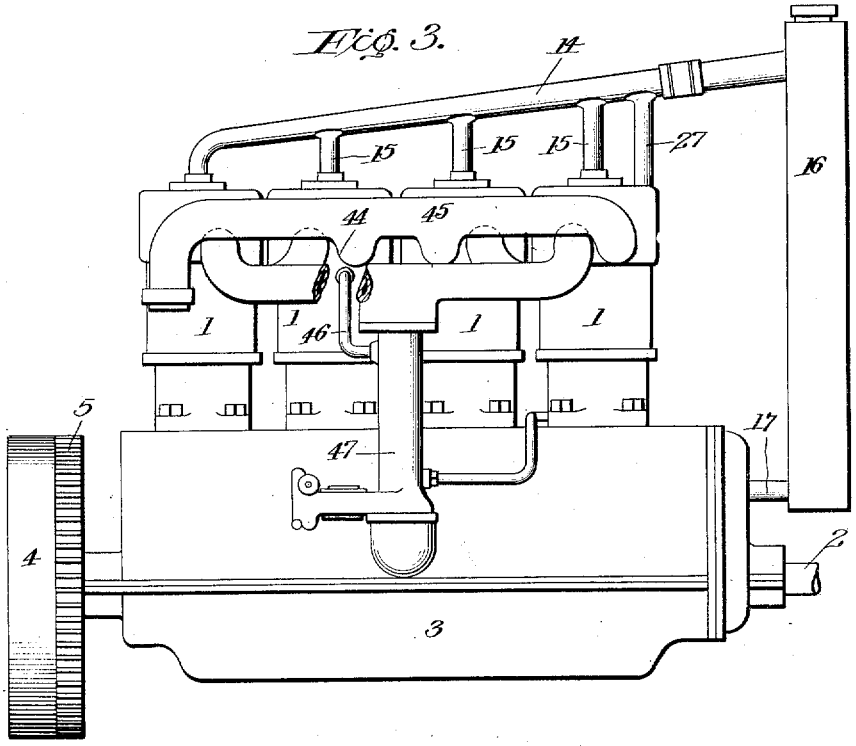
Figure 4:
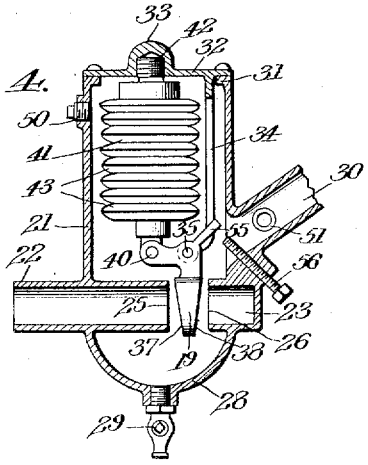

Referring to the drawings, Figure 1 is a side elevation of one embodiment of my invention. Fig. 2 is a diagrammatic view showing one manner of connecting the carbureter jacket to the remainder of the circulatory system. Fig. 3 is an elevation of the side opposite to Fig. 1. Fig. 4 is a vertical longitudinal section of a temperature-controlling valve that may be used in this system.

Similar reference characters refer to like parts throughout the several views.

In the embodiment shown, 1 indicates the jacketed cylinders of an internal combustion engine, the crank-shaft 2 of which passes through and is supported in bearings in the crank-case 3. The crank-shaft has secured to it the fly-wheel 4 having teeth 5 that mesh with the pinion 6 on the motor-generator shaft 7, which drives crank shaft for starting purpose through the action of the motor-generator. The motor-generator shaft also passes through the casing 10 of a proper centrifugal circulating pump. A silent chain in the case 11 and sprocket wheel at the front ends of the shafts 2 and 7 normally permit the crank shaft to drive the shaft 7.

The arrangement of the elements thus far described is old and well known.

Leading from the circulating pump casing 10 is a discharge pipe 12 that communicates with the water jackets of the various cylinders through the laterals 13; and these water jackets in turn communicate with the discharge manifold 14 by means of the pipes 15. The manifold 14 is connected with the upper end of the radiator 16, and from the lower end of the latter a pipe 17 leads to the body 21 of a thermal-controlled valve. As shown in Fig. 4, this valve comprises a body 21 having two intake passages 22 and 23, the walls of which terminate in the oppositely disposed valve seats 25 and 26. The passage 22 communicates with the pipe 17, and therefore the lower portion of the radiator; and the passage 23 is directly connected to the manifold 14, preferably at a point between the radiator and the next adjacent cylinder, by means of the by-pass 27. The valve body 21 may be provided with the hemispherical lower end 28, having a cock 29 therein whereby the system may be drained or sediment removed; and it is further provided with the discharge pipe 30 that may lead to and constitute the intake for the pump casing 10.

Mounted on the upper flanged end 31 of the body 21 is the cover 32, comprising the centrally located threaded boss 33, and the depending support 34 for the pivot 35 upon which is mounted the bell-crank 36, one arm of which carries the valve 19. The valve may be provided with the oppositely inclined faces 37 and 38 that are adapted to fit against the valve seats 25 and 26, respectively, when the valve is at the limits of its movement. Pivotally connected at 40 to the other arm of the bell-crank is the lower end of a thermostat 41, the upper end 42 of which is adjustable in the threaded boss 33 on the cover 32. The thermostat 41, the interior details of which are not shown, is of a well known construction, and comprises a series of resilient hollow frustoconical members 43 soldered or otherwise secured together to form a chamber that is filled with a liquid having a high co-efficient of expansion, such as ether or benzol.

Connected to one or more of the water jackets for the cylinders 1 (preferably to one of the hottest portions thereof, such, for example, as at a point near a connection 44 for the exhaust manifold 45), is a tube 46 (Fig. 3) that leads to the water jacket 47 of the carbureter chamber 48 (Fig. 2). The opposite end of the jacket 47 may be connected to the intake 30 of the pump casing 10 by means of the pipe 51, or it may be connected to the upper end of valve body 21 by the pipe 52 indicated in dotted lines in Fig. 2, and in full lines in Fig. 4, to a point normally closed by the plug 50.

Operation: The direction of flow of the large portion of the cooling liquid is from the pump casing 10 through the pipe 12 to the cylinders, then through the pipes 15 and 14. From the latter it divides, a part passing through the radiator 16, pipe 17 and passage 25, and a part through the by-pass 27 and passage 23 to the interior of the valve body 21, where the parts again combine and determine the operation of the thermostat 41. The pressures of the liquid flowing from the passages 22 and 23 on the valve 19 are substantially the same, so that the valve is peculiarly responsive to the action of the thermostat. From the casing 21 the liquid passes to the pump casing 10 through the intake 30. A portion of the hottest of the liquid passes from the cylinder jacket or jackets through the pipe 46, directly to the carbureter jacket 47, from which it is conducted by the pipe 51 to the intake 30, or through the pipe 52 to the upper end of the valve body 21, as the case may be. The result is that as soon as the engine is started, hot liquid is drawn through the carbureter casing, and the mixing chamber thereof is immediately heated to a degree sufficient to insure proper action of the carbureter. At the same time, the amount of cooling liquid which passes through the radiator, in proportion to the total amount, is so regulated by the valve 19 as to supply cooling liquid to the pump casing 10, (and therefore to the cylinder jackets 1) at a substantially constant temperature, regardless of the weather. If the temperature of the cooling liquid becomes too high, as it is liable to do so on a hot day, the valve 19 swings over toward the seat 26, partly or wholly preventing the flow of the liquid through the by-pass 27, and permits an increased flow through the radiator; on a cold day a relatively small proportion passes through the radiator and a correspondingly larger amount through the by-pass 27, as will be readily understood.

While I prefer to use the pipe 51 for returning the liquid from the jacket 47 of the carbureter to the pump for the reason that a very quick heating action of the carbureter is thereby attained, the pipe 52 will be found satisfactory in certain cases.

When a thermal-controlled valve is mounted at the point of connection between the pipe 27 and the manifold 14, to control the flow of liquids from the manifold to the radiator 16 or around the radiator, sudden interruptions of flow occur. At the starting of the engine, the passage to the radiator is closed and the cold liquid in the manifold 14 above the cylinders passes the control valve and down the pipe 27 to the pump and cylinders. During this time the weight of the water in the radiator is pressing toward the pump, and although but a small amount of cold water finds entrance, the little that does get in causes a pressure to exist around the cylinders and in the manifold and by-pass. When the highly heated liquid from the cylinder jackets reaches the control valve, the passage to the radiator is opened and that to the pipe 27 is closed, causing the liquid to flow to the radiator. This results, in a decrease of pressure at the discharge end of the pipe 17 and in the cold water from the radiator being forced through the water jackets by the pump. When this cold liquid passes the engine, it results in the cylinders being cooled below the desired temperature and in comparatively cool liquid passing the control valve, which results in a large proportion of the liquid again passing down the pipe 27. These sudden interruptions continue for some time, normally until the radiator becomes quite warm, but during very cold weather, this objectionable condition may continue indefinitely. But by placing the valve 21 as shown in the drawings at a point where it will discharge directly to the pump, the temperature of the discharged liquid will control the position of the valve 19, and this position will change very slowly after the pump has started to circulate the liquid around the cylinders.

In the event the thermostat 41 should become punctured, the rings 43 will immediately contract and swing the valve 37 against the cold water inlet 25. This may result in the cylinders overheating. An arm 55 may be connected to the bell-crank 36 and a screw 56 mounted in the body 21, whereby the valve can be swung to central position.

It is obvious that various modifications may be made in the details of construction without departing from the spirit of my invention. I do not, therefore, wish to be limited otherwise than as indicated in the subjoined claims.

I claim:—

1. A cooling system for internal combustion engines comprising an engine cylinder and a water jacket therefor, a device for feeding fuel to the cylinder, means for supplying liquid to the water jacket, a plurality of means for returning the cooling liquid from the water jacket to the supplying means, one of said returning means including a radiator, and another of said returning means passing in close proximity to the fuel feeding device to heat the latter, and means for controlling the amount of liquid that passes through the radiator.

2. A cooling system for internal combustion engines comprising an engine cylinder and a water jacket therefor, a device for feeding fuel to the cylinder, means for supplying liquid to the water jacket, a plurality of means for returning the cooling liquid from the water jacket to the supplying means, one of said returning means including a radiator, and another of said returning means passing in close proximity to the fuel feeding device to heat the latter, and thermal-controlled means for regulating the amount of liquid that passes through the radiator.

3. A cooling system for internal combustion engines comprising an engine cylinder and a water jacket therefor, a device for feeding fuel to the cylinder, means for supplying liquid to the water jacket, a plurality of means for returning the cooling liquid from the water jacket to the supplying means, one of said means including a conduit comprising two branches, one of which includes a radiator, means for determining the relative amount of liquid that passes through the branches, and another of said means for returning the cooling liquid comprising a conduit that passes in close proximity to the fuel feeding device for heating the latter.

4. A cooling system for internal combustion engines comprising an engine cylinder and a water jacket therefor, a device for feeding fuel to the cylinder, means for supplying liquid to the water jacket, a plurality of means for returning the cooling liquid from the water jacket to the supplying means, one of said means including a conduit comprising two branches, one of which includes a radiator, thermal-controlled means for determining the relative amount of liquid that passes through the branches, and another of said means for returning the cooling liquid comprising a conduit that passes in close proximity to the fuel feeding device for heating the latter.

5. A cooling system for internal combustion engines comprising an engine cylinder and a water jacket therefor, a carbureter, means for forcing cooling liquid into the water jacket of the cylinder, three conduits for returning the cooling liquid from the cylinder jacket, one of the conduits including a radiator and leading to a valve casing, another of the conduits also leading to the valve casing, and the third conduit including a water jacket for the carbureter, a valve casing, means within the valve casing for determining the relative amounts of liquid that pass through the two first mentioned conduits, and means for connecting all of the conduits with the means for forcing the liquid to the cylinder jacket.

6. A cooling system for internal combustion engines comprising an engine cylinder and a water jacket therefor, a carbureter, means for forcing cooling liquid into the water jacket of the cylinder, three conduits for returning the cooling liquid from the cylinder jacket, one of the conduits including a radiator and leading to a valve casing, another of the conduits also leading to the valve casing, and the third conduit including a water jacket for the carbureter, a valve casing, thermal-controlled means within the valve casing for determining the relative amounts of liquid that pass through the two first mentioned conduits, and means for connecting all of the conduits with the means for forcing the liquid to the cylinder jacket.

7. A cooling system for internal combustion engines comprising an engine cylinder and a water jacket therefor, a device for vaporizing fuel and feeding it to the cylinder, means for forcing liquid into the water jacket of the cylinder, a plurality of means for returning the cooling liquid from the water jacket to the supplying means, one of said returning means comprising more radiating surface than another, and the latter extending from a highly heated portion of the cylinder jacket to a point in close proximity to the fuel feeding device to heat the same.

8. A cooling system for internal combustion engines comprising an engine cylinder and a water jacket therefor, a device for vaporizing fuel and feeding it to the cylinder, means for forcing liquid into the water jacket of the cylinder, a plurality of means for returning the cooling liquid from the water jacket to the supplying means, one of said means extending from a highly heated portion of the water jacket to a point in close proximity to the fuel feeding device to heat the same, another including a radiator, and the third constituting a by-pass to return part of the liquid without allowing it to pass through the radiator.

9. A cooling system for internal combustion engines comprising a plurality of engine cylinders each provided with a water jacket, a device for vaporizing fuel and feeding it to the cylinders, means for forcing cooling liquid into the water jackets, said means comprising a pump and a discharge pipe therefor communicating with all of the water jackets, a plurality of means for returning the cooling liquid to the means for forcing the liquid to the water jackets, one of the returning means comprising a conduit that connects to a highly heated portion of one of the water jackets and passes in close proximity to the fuel feeding device to heat the latter, and another of the returning means comprising a divided conduit one branch of which includes a radiator.

10. The combination of a cylinder of an internal combustion engine provided with a jacket, a carbureter for said engine also provided with a jacket, a circulating pump for forcing liquid to the jacket of the cylinder, and pipes for conducting the circulating liquid from the jacket of the engine to the jacket of the carbureter, from the jacket of the carbureter to the pump, and from the pump to the engine jacket, and means for controlling the temperature of the liquid passing from the pump to the engine jacket.

11. The combination with the cylinder of an internal combustion engine and the cooling jacket therefor, of a pump for supplying cooling fluid to the jacket, a plurality of conduits for returning the cooling fluid from the jacket to the pump, a valve device located between the return conduits and the pump and constructed to positively control the flow of fluid through each of said return conduits, and a thermostat connected to operate said valve device, said thermostat being arranged to be subjected to the fluid coming through any or all said return conduits.

12. The combination with the cylinder of an internal combustion engine and the cooling jacket therefor, of a pump for supplying cooling fluid to the jacket, two conduits for returning the cooling fluid from the jacket to the pump, one of said conduits including a radiator, a valve device located between the return conduits and the pump and constructed to positively control the flow of fluid through each of said return conduits, and a thermostat connected to operate said valve device, said thermostat being arranged to be subjected to the fluid coming through either or both said return conduits.

13. The combination with the cylinder of an internal combustion engine and the cooling jacket therefor, of a pump for supplying cooling fluid to the jacket, a plurality of conduits for returning the cooling fluid from the jacket to the pump, a valve device located between the return conduits and the pump and constructed to positively control the flow of fluid through each of said return conduits, and a thermostat connected to operate said valve device, said thermostat being controlled by the fluid coming through all said return conduits.

14. The combination with the cylinder of an internal combustion engine and the cooling jacket therefor, of a pump for supplying cooling fluid to the jacket, two conduits for returning the cooling fluid from the jacket to the pump, one of said conduits including a radiator, a valve device located between the return conduits and the pump and constructed to positively control the flow of fluid through each of said return conduits, and a thermostat connected to operate said valve device, said thermostat being controlled by the fluid coming through both said return conduits.

15. The combination with the cylinder of an internal combustion engine and the cooling jacket therefor, of a pump for supplying cooling fluid to the jacket, a plurality of conduits for returning the cooling fluid from the jacket to the pump, one of said conduits including a radiator, a valve device and thermostatic means for operating the same to control the flow of fluid through the several conduits, and manually operated means for controlling said valve device independently of the thermostat.

16. The combination with the cylinder of an internal combustion engine and the cooling jacket therefor, of a pump for supplying cooling fluid to the jacket, a plurality of conduits for returning the cooling fluid from the jacket to the pump, one of said conduits including a radiator, a valve device, thermostatic means for operating the same to control the flow of fluid through the several conduits, and manually operated means for controlling said valve device independently of the thermostat to maintain the return conduit through the radiator open.

In testimony whereof, I affix my signature in the presence of two witnesses.

CHESTER F. JOHNSON.

Witnesses:

C. B. ELDREDGE,

F. L. DAVIS.